United States Patent
Frey et al.

(10) Patent No.: US 7,739,374 B1
(45) Date of Patent: Jun. 15, 2010

(54) SYSTEM AND METHOD FOR CONFIGURING TRACING AND LOGGING FUNCTIONS

(75) Inventors: Gregor K. Frey, Karlsruhe (DE); Heiko D. Kiessling, Eppelheim (DE); Miroslav R. Petrov, Sofia (BG); Georgi G. Manev, Sofia (BG); Nikola I. Marchev, Sofia (BG)

(73) Assignee: SAP AG, Walldorf (DE)

( * ) Notice: Subject to any disclaimer, the term of this patent is extended or adjusted under 35 U.S.C. 154(b) by 1290 days.

(21) Appl. No.: 10/749,615

(22) Filed: Dec. 30, 2003

(51) Int. Cl.
G06F 15/173 (2006.01)
(52) U.S. Cl. ...................... 709/224; 709/223
(58) Field of Classification Search ............... None
See application file for complete search history.

(56) References Cited

U.S. PATENT DOCUMENTS

| 5,201,044 | A | | 4/1993 | Frey et al. |
| 5,608,720 | A | * | 3/1997 | Biegel et al. ........... 370/249 |
| 6,061,721 | A | | 5/2000 | Ismael et al. |
| 6,083,281 | A | | 7/2000 | Diec et al. |
| 6,144,967 | A | * | 11/2000 | Nock ............ 707/103 R |
| 6,308,208 | B1 | | 10/2001 | Jung et al. |
| 6,356,931 | B2 | | 3/2002 | Ismael et al. |
| 6,470,388 | B1 | | 10/2002 | Niemi et al. |
| 6,539,501 | B1 | * | 3/2003 | Edwards ............. 714/45 |
| 6,553,403 | B1 | | 4/2003 | Jarriel et al. |
| 6,567,809 | B2 | | 5/2003 | Santosuosso |
| 6,681,232 | B1 | | 1/2004 | Sistanizadeh |
| 6,738,933 | B2 | | 5/2004 | Fraenkel et al. |
| 6,772,178 | B2 | | 8/2004 | Mandal et al. |
| 6,789,257 | B1 | | 9/2004 | MacPhail |
| 6,802,067 | B1 | * | 10/2004 | Camp et al. ........... 719/315 |

(Continued)

FOREIGN PATENT DOCUMENTS

JP 2001195151 7/2001

(Continued)

OTHER PUBLICATIONS

Log file logging levels, Aug. 14, 2003, Retrieved from internet archive on Jul. 1, 2009 at: http://web.archive.org/web/20030814011949/http://www.faqs.org/docs/evms/loglevels.html.*

(Continued)

*Primary Examiner*—John Follansbee
*Assistant Examiner*—Matthew S Lindsey
(74) *Attorney, Agent, or Firm*—Blakely Sokoloff Taylor & Zafman LLP

(57) ABSTRACT

An integrated tracing and logging system for an enterprise network is described. One embodiment of the integrated logging and tracing system has an object-oriented architecture which includes a controller class with two sub-classes: a tracing sub-class and a logging sub-class. Instances of the tracing sub-class (tracing modules) are associated with specified program code regions of network applications. The tracing modules receive method calls from the network applications and process the method calls based on defined severity levels. Instances of the logging sub-class (logging modules) are associated with specified "categories" related to the enterprise network (e.g., system, database, etc). The logging modules receive and process method calls from network components associated with the categories. The integrated logging and tracing system provides a unique architecture for configuring the logging and tracing modules using minimum/maximum severity settings and inheritance.

18 Claims, 6 Drawing Sheets

U.S. PATENT DOCUMENTS

| | | |
|---|---|---|
| 6,834,301 B1 | 12/2004 | Hanchett |
| 6,836,878 B1 | 12/2004 | Cuomo et al. |
| 6,851,118 B1 | 2/2005 | Ismael et al. |
| 6,862,711 B1 | 3/2005 | Bahrs et al. |
| 6,880,125 B2 | 4/2005 | Fry |
| 6,925,631 B2 | 8/2005 | Golden |
| 6,985,848 B2 | 1/2006 | Swoboda et al. |
| 6,990,601 B1 | 1/2006 | Tsuneya et al. |
| 7,000,235 B2 | 2/2006 | Mandal et al. |
| 7,017,051 B2 | 3/2006 | Patrick |
| 7,017,162 B2 | 3/2006 | Smith et al. |
| 7,024,474 B2 | 4/2006 | Clubb et al. |
| 7,051,324 B2 | 5/2006 | Gissel et al. |
| 7,058,558 B2 | 6/2006 | Reichenthal |
| 7,062,540 B2 | 6/2006 | Reddy et al. |
| 7,069,267 B2 | 6/2006 | Spencer, Jr. |
| 7,086,065 B1 | 8/2006 | Yeluripati et al. |
| 7,120,685 B2 * | 10/2006 | Ullmann et al. ............. 709/224 |
| 7,152,104 B2 | 12/2006 | Musante et al. |
| 7,174,370 B1 * | 2/2007 | Saini et al. .................. 709/220 |
| 7,200,588 B1 | 4/2007 | Srivastava et al. |
| 7,206,827 B2 | 4/2007 | Viswanath et al. |
| 7,240,334 B1 | 7/2007 | Fluke et al. |
| 7,251,809 B2 | 7/2007 | Barclay et al. |
| 7,305,671 B2 | 12/2007 | Davidov et al. |
| 2002/0029298 A1 | 3/2002 | Wilson |
| 2003/0005173 A1 * | 1/2003 | Shah et al. .................. 709/318 |
| 2003/0110252 A1 | 6/2003 | Yang-Huffman |
| 2003/0120593 A1 | 6/2003 | Bansal et al. |
| 2003/0135556 A1 | 7/2003 | Holdsworth |
| 2003/0167304 A1 | 9/2003 | Zhu et al. |
| 2003/0225872 A1 | 12/2003 | Bartek et al. |
| 2004/0022237 A1 | 2/2004 | Elliott et al. |
| 2004/0028059 A1 * | 2/2004 | Josyula et al. ............. 370/396 |
| 2004/0148356 A1 | 7/2004 | Bishop, Jr. et al. |
| 2004/0148610 A1 | 7/2004 | Tsun et al. |
| 2004/0158837 A1 | 8/2004 | Sengodan |
| 2004/0230973 A1 | 11/2004 | Cundiff, Jr. et al. |
| 2004/0237093 A1 * | 11/2004 | Sluiman et al. ............. 719/318 |
| 2004/0249613 A1 | 12/2004 | Sprogis et al. |
| 2004/0268314 A1 | 12/2004 | Kollman et al. |
| 2005/0010608 A1 | 1/2005 | Horikawa |
| 2005/0028171 A1 | 2/2005 | Kougiouris et al. |
| 2005/0033777 A1 | 2/2005 | Moraes et al. |
| 2005/0038889 A1 | 2/2005 | Frietsch |
| 2005/0097110 A1 | 5/2005 | Nishanov et al. |
| 2005/0102536 A1 | 5/2005 | Patrick et al. |
| 2005/0132337 A1 | 6/2005 | Wedel et al. |
| 2007/0156656 A1 | 7/2007 | Pather et al. |

FOREIGN PATENT DOCUMENTS

| | | |
|---|---|---|
| JP | 2002073522 | 3/2002 |
| JP | 2002082777 | 3/2002 |
| WO | WO 0205102 A1 | 1/2002 |
| WO | WO 0241154 A2 | 5/2002 |

OTHER PUBLICATIONS

Petrov, M, et al., "System and Method for Integrated Logging and Tracing Functions in an Enterprise Network", U.S. Appl. No. 10/749,616, filed Dec. 30, 2003, Office Action mailed Jul. 6, 2007, 11 pages.

Petrov, M, et al., "System and Method for Integrated Logging and Tracing Functions in an Enterprise Network", U.S. Appl. No. 10/749,616, filed Dec. 30, 2003, Office Action mailed Mar. 27, 2008, 10 pages.

"The Source for Developers: Core Java Java Management Extensions (JMX)", Sun Microsystems, Inc., "The Source for Developers: Core Java Java Management Extensions (JMX)" 2 pages, http://java.sun.com/products/JavaManagement/printed Apr. 2, 2004., 2 pages.

Hampton, Kip , "High-Performance XML Parsing with SAX", Published on XML.com by Feb. 14, 2001.

Mcalaughlin, Brett, "Tip: Set up a SAX Parser", Published by International Business Machines Corporation on Jul. 2, 2003.

"EarlyAdopter_DS.pdf, Bibliographic Data for "Early Adopter: J2SE 1.4"", by Wrox Press, p. 1.

"Java Logging Overview", (Nov. 2001), pp. 1-9.

Hart, James, "Early Adopter: J2SE 1.4", Chapter 5, Wrox Press, (Sep. 2001), pp. 1-12.

"Package Gnu.Bytecode", *Package Gnu.Bytecode*, http://sources.redhat.com/kawa/api.gnu/bytecode/package-summary.html, 4 pages, printed Sep. 28, 2006.

* cited by examiner

| Severity | Value | Details |
| --- | --- | --- |
| MIN | 0 | Minimum restriction |
| DEBUG | 100 | For debugging purpose, with extensive and low level information |
| PATH | 200 | For tracing the execution flow, e.g., used in the context of entering and leaving a method, looping and branching operations |
| INFO | 300 | Informational text, mostly for echoing what has been performed |
| WARNING | 400 | Application can recover from anomaly, and fulfill the desired task, but need attention from developer/operator |
| ERROR | 500 | Application can recover from error, but cannot fulfill desired task due to the error |
| FATAL | 600 | Application cannot recover from error, and the severe situation causes fatal termination |
| MAX | 700 | Maximum restriction |

*Fig. 6a*

| Severity | Value | Details |
| --- | --- | --- |
| ALL | 0 | Output messages of all severity |
| NONE | 701 | No messages will be logged |

*Fig. 6b*

SYSTEM AND METHOD FOR CONFIGURING TRACING AND LOGGING FUNCTIONS

BACKGROUND

1. Field of the Invention

This invention relates generally to the field of data processing systems. More particularly, the invention relates to a system and method for configuring tracing and logging functions within an enterprise network.

2. Description of the Related Art

Logging is employed within virtually all data networks. "Logging" refers generally to recording network-related and/or application-related information in response to one or more predefined network/application events. For example, when an end-user opens a TCP connection to a server, or unsuccessfully attempts to gain access to network resources (e.g., by attempting to log in to a particular server), this information is typically recorded as an entry within a log file. Similarly, if a variable within an application rises above a specified threshold value, a log entry indicating the value and the date and time that the threshold value was exceeded may be stored within a log file. Logging techniques may be employed to record any specified network/application event. Network administrators may then review the log files to identify security issues and/or troubleshoot network problems.

Logging functionality is provided within the Java™ 2 Standard Edition ("J2SE™") platform and the Java 2 Enterprise Edition "J2EE™" platform. Referring to FIG. 1, in a Java environment, Java applications 101 make logging calls on "logger" objects 110, 112, 114. Each logger object is used to log messages for a specific system or application component. Loggers are normally named using a hierarchical dot-separated namespace. Logger names can be arbitrary strings, but they are typically based on the package name or class name of the logged component (e.g., such as java.net or javax.swing). In addition, it is possible to create "anonymous" loggers that are not stored in the logger namespace. Loggers are organized in a hierarchical namespace in which child loggers 112, 114 may inherit logging properties from their parents 110 in the namespace.

Each logger 110, 112, 114 may have a threshold "Level" associated with it which reflects a minimum defined logging value (e.g., priority level) that the logger cares about. If a logger's level is set to null, then its effective level is inherited from its parent, which may in turn obtain it recursively from its parent, and so on up the tree.

In response to logging calls from applications 101, the logger objects 110, 112, 114 allocate Log Record objects which are passed to handler objects 130 for publication. For example, a first type of handler object may write log records to an output stream, a second type of handler object may write log records to a file (or to a set of rotating log files) and a third handler may write log records to remote TCP ports. Developers requiring specific functionality may develop a handler from scratch or subclass one of the handlers in J2SE.

Both loggers 110, 112, 114 and handlers 130 may use filters 120, 121 to filter out certain designated types of log records. In addition, when publishing a log record externally, a handler may optionally use a formatter 122 to localize and format the message before writing it to a particular destination. For example, J2SE includes a "simple formatter" for writing short "human-readable" summaries of log records and an XML formatter for writing detailed XML-structured information.

Tracing

"Tracing" is a technique used primarily by software developers to track the execution of program code. For example, when developing an application, developers trace the execution of methods or functions within certain modules to identify problems and/or to determine if the program code may be improved. If a particular method takes an inordinate amount of time to complete, the developer may determine the reasons why and/or change the program code to operate more efficiently.

Developers use trace tools to trace the execution of program code. Trace tools are proprietary application programs which use different techniques to trace the execution flows for an executing program. One technique, referred to as event-based profiling, tracks particular sequences of instructions by recording application-generated events as they occur. By way of example, a trace tool may record each entry into, and each exit from, a module, subroutine, function, method, or system component within a trace file (e.g., a time-stamped entry may be recorded within the trace file for each such event). Trace events may also be sent to a console or other output destination.

Thus, tracing and logging techniques rely on similar event-based triggers, employ similar messaging techniques and record log/trace events to similar output destinations (e.g., trace/log files, consoles, . . . etc) in a substantially similar manner. As such, it would be beneficial to develop an integrated application programming interface which takes advantage of the similarities of tracing and logging operations, and of the synergistic effects of handling both, while not neglecting the differences.

SUMMARY

An integrated tracing and logging system for an enterprise network is described. One embodiment of the integrated logging and tracing system has an object-oriented architecture which includes a controller class with two sub-classes: a tracing sub-class and a logging sub-class. Instances of the tracing sub-class (tracing modules) are associated with specified program code regions of network applications. The tracing modules receive method calls from the network applications and process the method calls based on defined severity levels. Instances of the logging sub-class (logging modules) are associated with specified "categories" related to the enterprise network (e.g., system, database, etc). The logging modules receive and process method calls from network components associated with the categories. The integrated logging and tracing system provides a unique architecture for configuring the logging and tracing modules using minimum/maximum severity settings and inheritance.

BRIEF DESCRIPTION OF THE DRAWINGS

A better understanding of the present invention can be obtained from the following detailed description in conjunction with the following drawings, in which:

FIGS. 6a-b illustrate severity levels associated with tracing and logging controllers according to one embodiment of the invention.

DETAILED DESCRIPTION OF PREFERRED EMBODIMENTS

Described below is an integrated framework and method which supports both logging and tracing functions. Also described is a system and method for configuring logging and tracing functions using inheritance. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

EMBODIMENTS OF THE INVENTION

Figure 1:
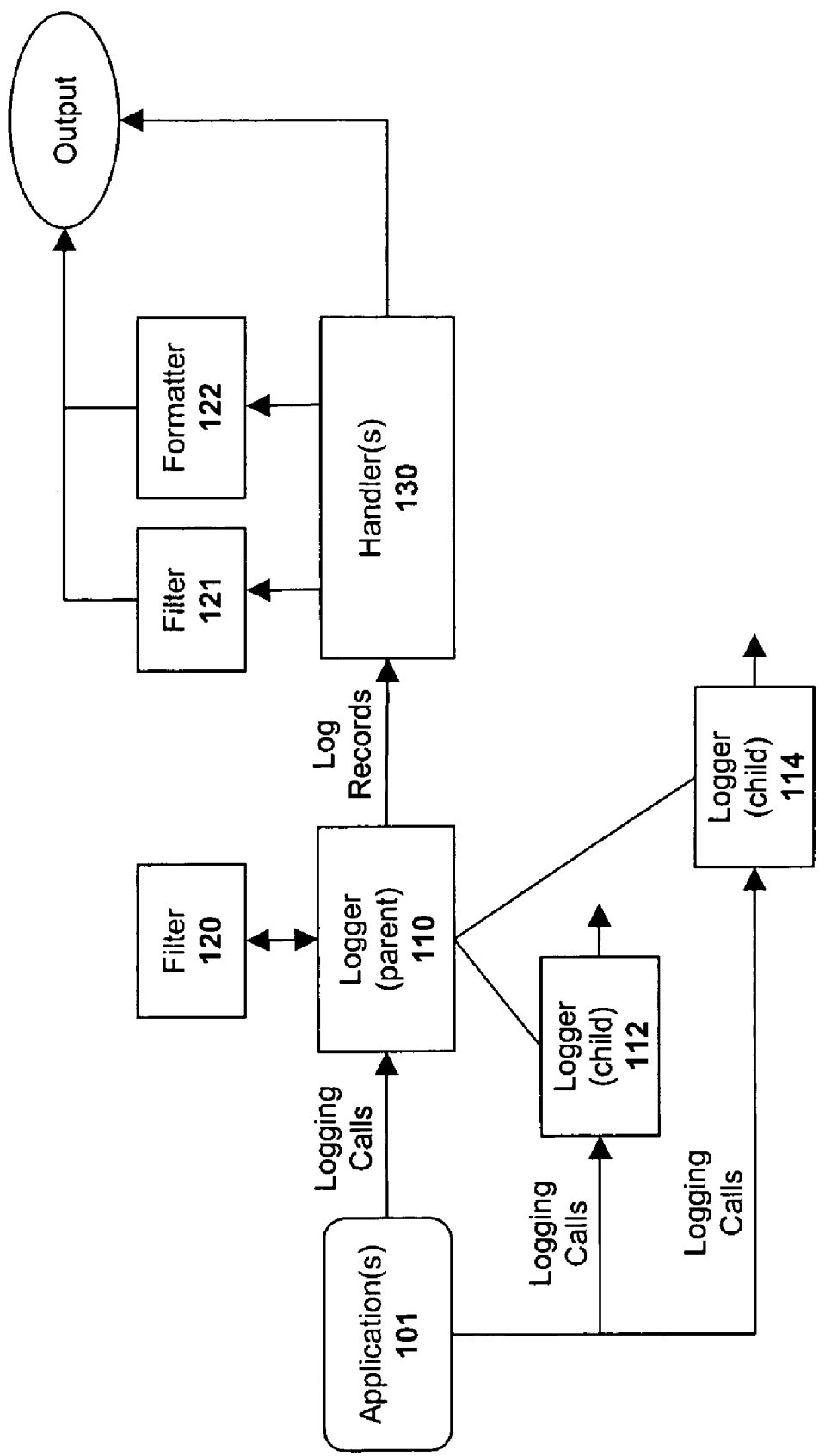
FIG. 1 illustrates a prior art system for performing logging operations.
Figure 2:
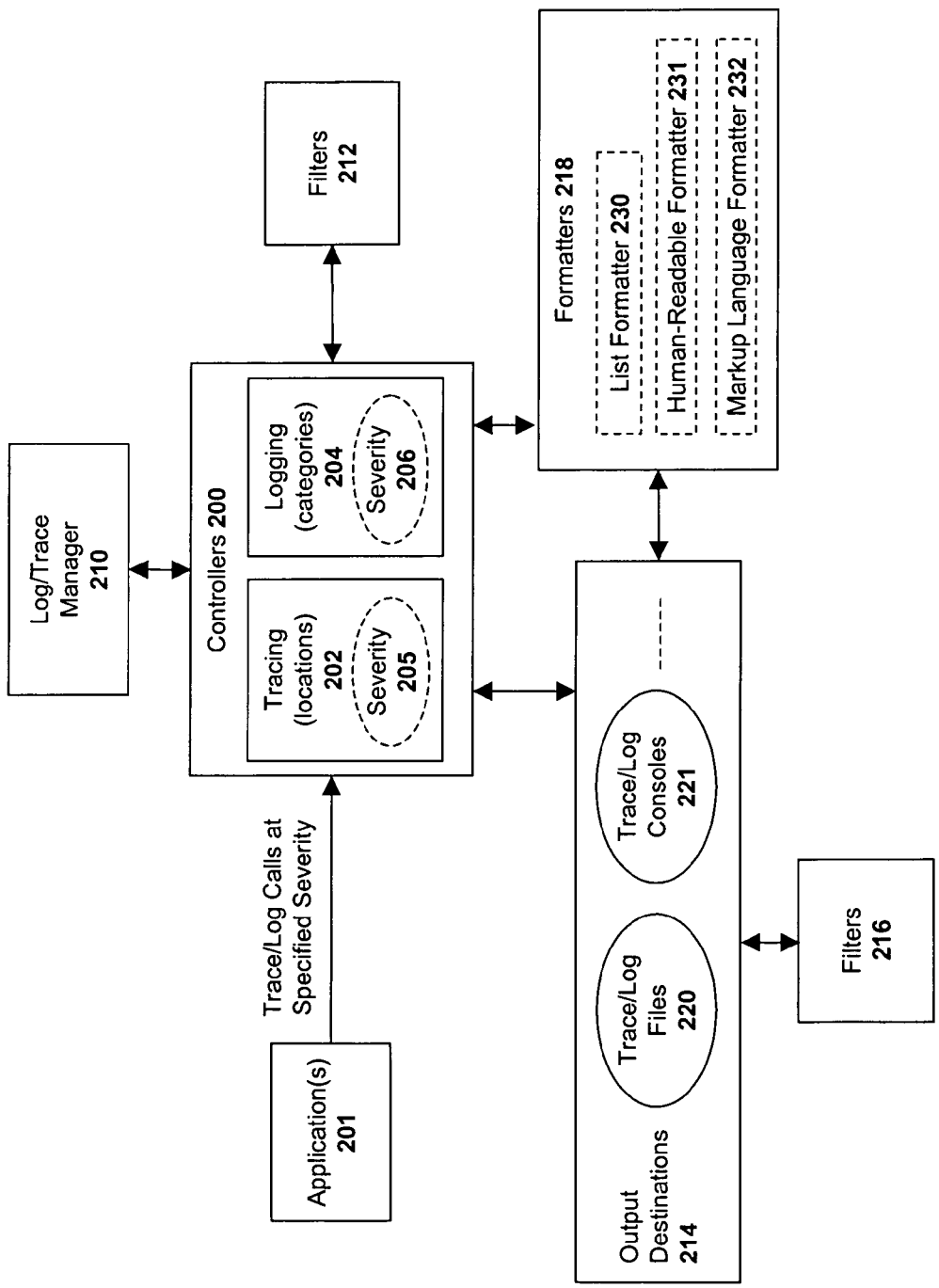
FIG. 2 illustrates a system for performing both logging and tracing operations according to one embodiment of the invention.

A system architecture according to one embodiment of the invention is illustrated in FIG. 2. The architecture includes a plurality of controllers 200 managed by a log/trace manager 210. The controllers 200 are configured to process trace/logging events generated by a plurality of different applications 201. As used herein, the term "application" is used broadly to refer to any type of program code executed on a computer and/or transmitted over a network (e.g., using a particular network protocol). One embodiment of the invention is implemented in an object-oriented programming environment such as Java (e.g., within a J2EE platform/engine). In this embodiment, each of the modules illustrated in FIG. 2 are represented by objects and/or classes. The classes and/or objects of this embodiment comprise an application programming interface ("API") usable to configure logging and/or tracing operations within a Java environment. It should be noted however, that the underlying principles of the invention are not limited to any particular programming environment.

In one embodiment, each controller 200 is an instance of a defined "controller" class (e.g., a Java class) which includes two sub-classes, a "tracing" sub-class and a "logging" sub-class (described in detail below), which provide features specific to tracing and logging operations, respectively. In an object-oriented environment such as Java, the tracing controller 202 illustrated in FIG. 2 represents an instance of the tracing sub-class and the logging controller 204 represents an instance of the logging sub-class. In one embodiment of the invention, tracing controllers 202 are associated with program code locations (e.g., locations within packages, classes, . . . etc) whereas logging controllers 204 are associated with system categories (e.g., logical system categories such as database, network, . . . etc).

The Controller Class

The controller class provides methods for associating log/trace output destinations with specific controllers 200 and for controlling the actual writing of log/trace messages. When a method is called, the writing of the log/trace message to a log/trace file 220, console 221 or other output destination 214 depends on the severity level associated with the message, the severity settings 205, 206 of the relevant controller(s) 200, and the filtering configuration of one or more optional filters 212, 216. For example, in one embodiment, messages having a severity level greater than or equal to the effective severity of the relevant controller 200 are candidates for output and are forwarded to the output destinations 214 attached to the controller 200 (i.e., assuming that the messages are not filtered by one of the filters 212, 216).

A variety of different severity levels may be defined. In one embodiment of the invention, illustrated in FIG. 6a, the following severity levels are defined (from lowest to highest severity level): MINIMUM, DEBUG, PATH, INFO, WARNING, ERROR, FATAL, and MAXIMUM. The general description for each severity level is set forth in FIG. 6a. In addition, as illustrated in FIG. 6b, in one embodiment, logging and tracing may be totally enabled or disabled using the severity settings of ALL or NONE, respectively. As indicated in the second column of FIGS. 6a-b, each of the descriptive threshold levels may have an associated numeric value (e.g., DEBUG=100, PATH=200, . . . etc).

Before (or after) evaluating the trace/log message based on severity, filters 212 associated with the controller 200 may filter the messages based on predefined filtering criteria. By way of example, if a particular controller 200 is capable of writing to both a file and a console, a filter 212 may be assigned to filter messages directed to the file, thereby limiting output to the console only. Thus, using filters, a finer granularity of log controller 200 output may be defined, using variables other than merely severity. As illustrated in FIG. 2, filters may be associated with particular log controllers 200 and/or with specific output destinations 214 (e.g., specific log/trace files). As mentioned above, filters may be associated with both controllers 200 and/or output destinations 214 to further restrict or alter the output tracing and logging behavior. In one embodiment, multiple filters having different filtering criteria may be allocated to each controller 200 and/or destination 214.

The Logging Sub-Class

As mentioned briefly above, in one embodiment, the logging operations performed by the logging controller 204 are associated with particular "categories" which may identify, for example, semantical topics which correspond roughly to administration tasks or problem areas. Typical areas identified by categories may include databases, networking, security and auditing.

In one embodiment, categories are named according to the hierarchical structure known from file systems on the network. For example, referring to FIG. 3, all categories of log messages associated with the system 311 may be logically grouped into sub-categories, such as database 312 or networking 313, identified by the names "/System/Database" and "/System/Network," respectively. In this example, the category "/System" 311 is the parent of categories "/System/Database" and "/System/Network," and therefore passes on its settings (e.g., severity thresholds) and attached output destinations 214 to both of them. One benefit to this arrangement is that if all log messages are to be written to the same log file, the log file does not necessary need to be directly associated with both the database 312 and networking 313 categories, but simply to the common parent, System 311.

The Tracing Sub-Class

In one embodiment, in contrast to logging operations which are associated with categories, tracing operations performed by the tracing controllers 202 are associated with particular program code locations, identified by particular package, class, or function names. For example, in a Java environment, locations may be named according to the hierarchical structure known from Java packages.

Figure 3:
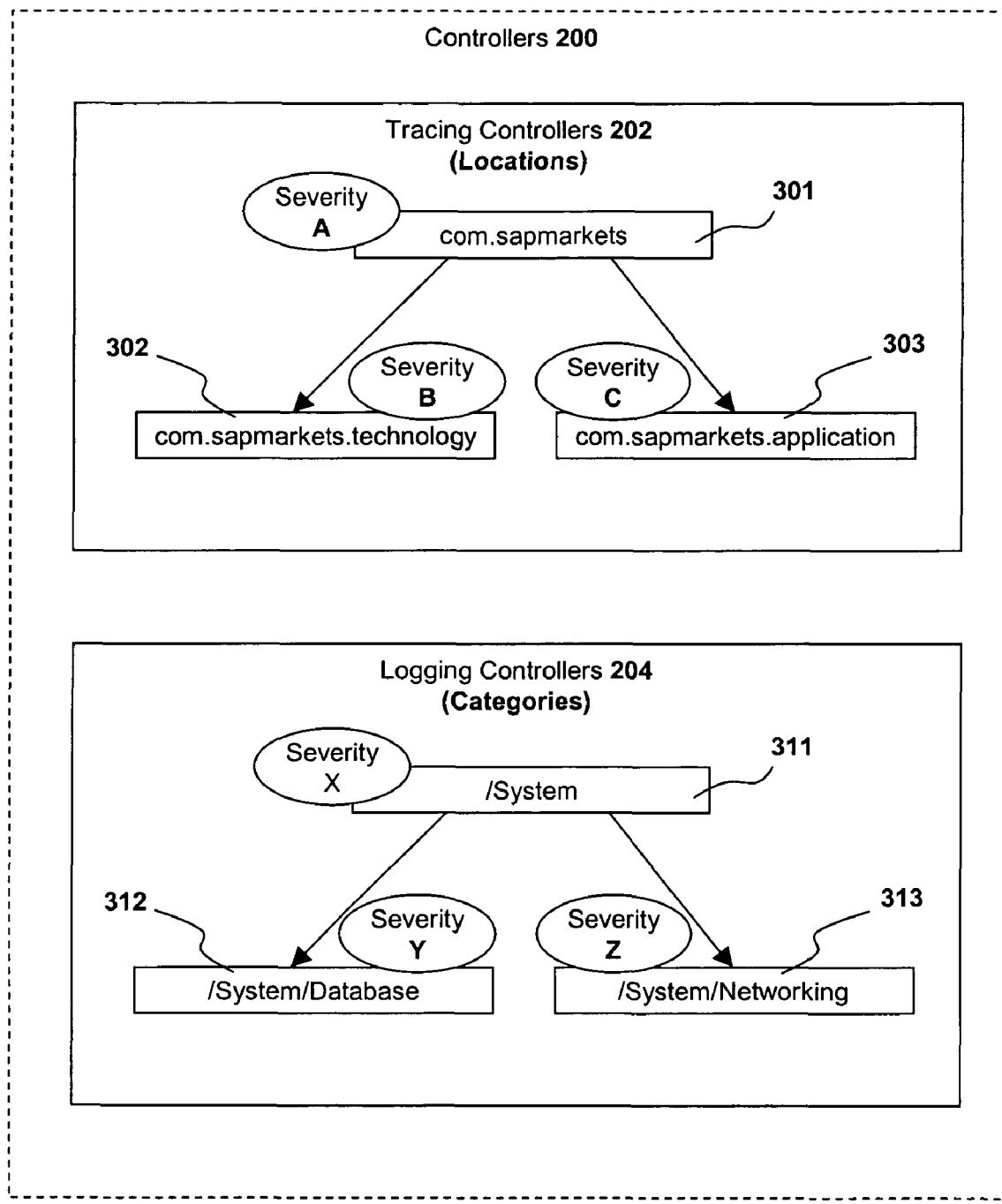
FIG. 3 illustrates hierarchical relationships among tracing and logging controllers according to one embodiment of the invention.

In the example illustrated in FIG. 3, the location "com.sapmarkets" 301 is logically grouped into technology and application sub-locations, identified by the controller names "com.sapmarkets.technology" 302 and "com.sapmarkets.application" 303, respectively. In this example, the location "com.sapmarkets" 301 is the parent of locations "com.sapmarkets.technology" 302 and "com.sapmarkets.application" 303," and therefore passes on its settings (e.g., severity thresholds) and attached output destinations 214 to both of them. As with the logging controllers, a benefit to this configuration is that if all trace messages are to be written to the same trace file, the trace file does not need to be directly associated with both the technology and application locations, but simply to the common parent, "com.sapmarkets" 301.

As an additional example, to write all the messages from monitoring classes into a single log, the location named "com.sap.tc.monitoring" may be called. All the messages from technology components (TC) may be directed to a common trace destination by simply assigning that destination to the parent location "com.sap.tc." The trace output destination is then passed on to all child locations (e.g., to "com.sap.tc.monitoring"). Moreover, it is possible to include method signatures in location names. For example, "com.sap.tc.monitoring.Node.announce (java.lang.Object)" is a location for a method named "announce" with an argument of the class Object. In this way, overloaded methods can be identified and, by adding another suffix to such a name, even classes local to them. In a Java environment, the hierarchical components of the name should be compliant with Java identifier syntax, but illegal characters may be used, bracketing a component with single quotes (e.g., com.sap.'great.technology').

In one embodiment, all locations are accessed via a defined static method "Location.getLocation." In one embodiment, the static method need not be called each time a trace message is to be generated. Instead, each class defines static fields to hold all the needed locations, and uses these fields to call logging/tracing methods.

Controlling Severity Settings Using Inheritance

In one embodiment, the various controllers 200 are arranged into logical hierarchies in which each child controller inherits properties from its parent (e.g., its severity settings and its output destinations 214). The effective severity of a child log controller is calculated from minimum and maximum defined severities, as well as the effective severity of its parent. The minimum severity setting specifies the minimum severity value for the trace/log messages to be output via the child log controller. That is, if the effective severity of the parent log controller is higher than the minimum severity of the child, then the child inherits the parent's effective severity; otherwise the effective severity is set to the minimum severity.

By contrast, the maximum severity represents the severity that trace/log messages must have for output to be guaranteed (notwithstanding intervention from filters). For example, if the effective severity of the parent log controller is lower than the maximum severity of the child then the child inherits the parent's effective severity; otherwise the child's effective severity is set to the maximum severity. This implies that if both minimum and maximum severity are set to the same value, the effective severity is set to that value regardless of the effective severity of the parent. Such a setting is therefore called dominant. For root log/trace controllers the setting must be dominant, as separate minimum and maximum values are meaningless without a parent to inherit from.

Figure 4:
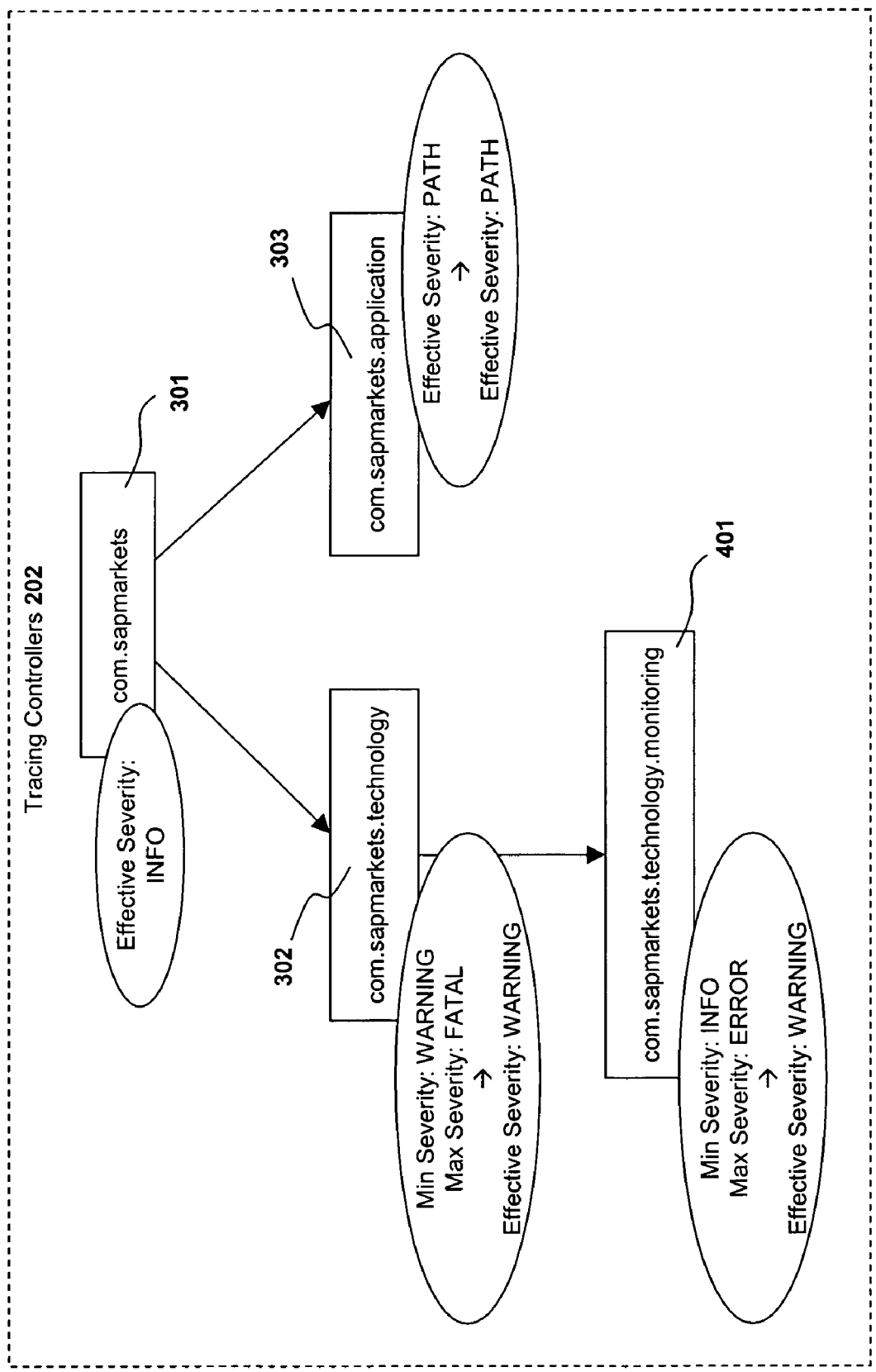
FIG. 4 illustrates one embodiment of the invention in which severity settings of trace/log controllers are configured using inheritance.

FIG. 4 illustrates an exemplary set of tracing controllers 202 which are configured through inheritance. Specifically, tracing controller "com.sapmarkets," the root controller, is configured with an effective severity of INFO. Controller "com.sapmarkets.technology" 302, a child of controller 202, is programmed with a minimum severity level of WARNING and a maximum severity level of FATAL. Because the effective severity of parent controller 301 is lower than the minimum severity setting of child controller 302, the effective severity of the child controller 302 is its minimum severity setting, WARNING.

Similarly, tracing controller "com.sapmarkets.technology.monitoring" 401, is programmed with a minimum severity of INFO and a maximum severity of ERROR. Accordingly, because the effective severity of its parent controller 302 (WARNING) is higher than its minimum severity, INFO, and lower than its maximum severity, ERROR, tracing controller 401 inherits its parent's effective severity of WARNING.

By contrast, tracing controller "com.sapmarkets.application" 303 is manually configured with an effective severity of PATH, which overrides the effective severity of INFO inherited from its parent tracing controller "com.sapmarkets" 301.

It should be noted, of course, that the specific details set forth above are used merely for the purpose of illustration. The underlying principles of the invention are not limited to any particular logging/tracing controller hierarchy or any particular severity settings.

Output Formatters

As illustrated in FIG. 2, one embodiment of the invention includes a plurality of log/trace formatters 218 to format the results of the log/trace controllers 200, for example, based on the specified destination to which the controller output is directed. Three formatters are illustrated in FIG. 2: a list formatter 230, a human-readable formatter 231, and an XML formatter 232.

In one embodiment, the list formatter 230 translates the output of the log/trace controllers into a format which may be further processed by an application, e.g. a log viewer, instead of being read directly by an end-user. In one embodiment, the format generated by the list formatter comprises hash-separated fields which may be readily interpreted by the other applications. For example: #1.3#10.48.27.165:4A5AB2:E99D42D4F4:-8000#Mon Jan 01 22:00:00 PDT2001#com.sapmarkets.FooClass#com.sapmarkets.FooClass.fooMethod#main##0#0#Fatal##Plain###A sample fatal message#.

As its name suggests, the human readable formatter 231 translates the output of the log/trace controllers into a human-readable format (e.g., ASCII text). As such, this formatted may be used when users/administrators need to quickly understand what is occurring within a network or application. For example, the human readable formatter 231 may provide its formatted output to a trace/log console for immediate viewing.

The markup language formatter 232 translates the output of the log/trace controllers into a particular markup language such as the Extensible Markup Language ("XML") format which may be interpreted by any application that includes support for XML (e.g., Microsoft Word).

Relationship Between Logging and Tracing Operations

Messages associated with a particular category may also be associated with (i.e., may be written with respect to) a source code area, or location, such as a component, a package, a class or a method. As the location may be associated with a particular tracing controller, the same method call can write a message simultaneously to, for example, the database log as well as to the location trace responsible for that part of the source code (i.e., save for the location having an appropriate severity setting). In one embodiment of the invention, both the trace message and the log message are generated with the same identification in order to facilitate cross-referencing among location and category logs. At the same time, the location provides a location description, that is a string, to the log message written to the database log. This may become tedious when a class implements a large number of methods. Therefore, as described in greater detail below, for each logging/tracing method there is a version which takes in an additional parameter, referred to herein as "subloc," which is a string that serves as suffix to the name of the used location, thus providing the option to give a complete location name whilst avoiding clutter.

Examples of Tracing/Logging Operation

Figure 5:
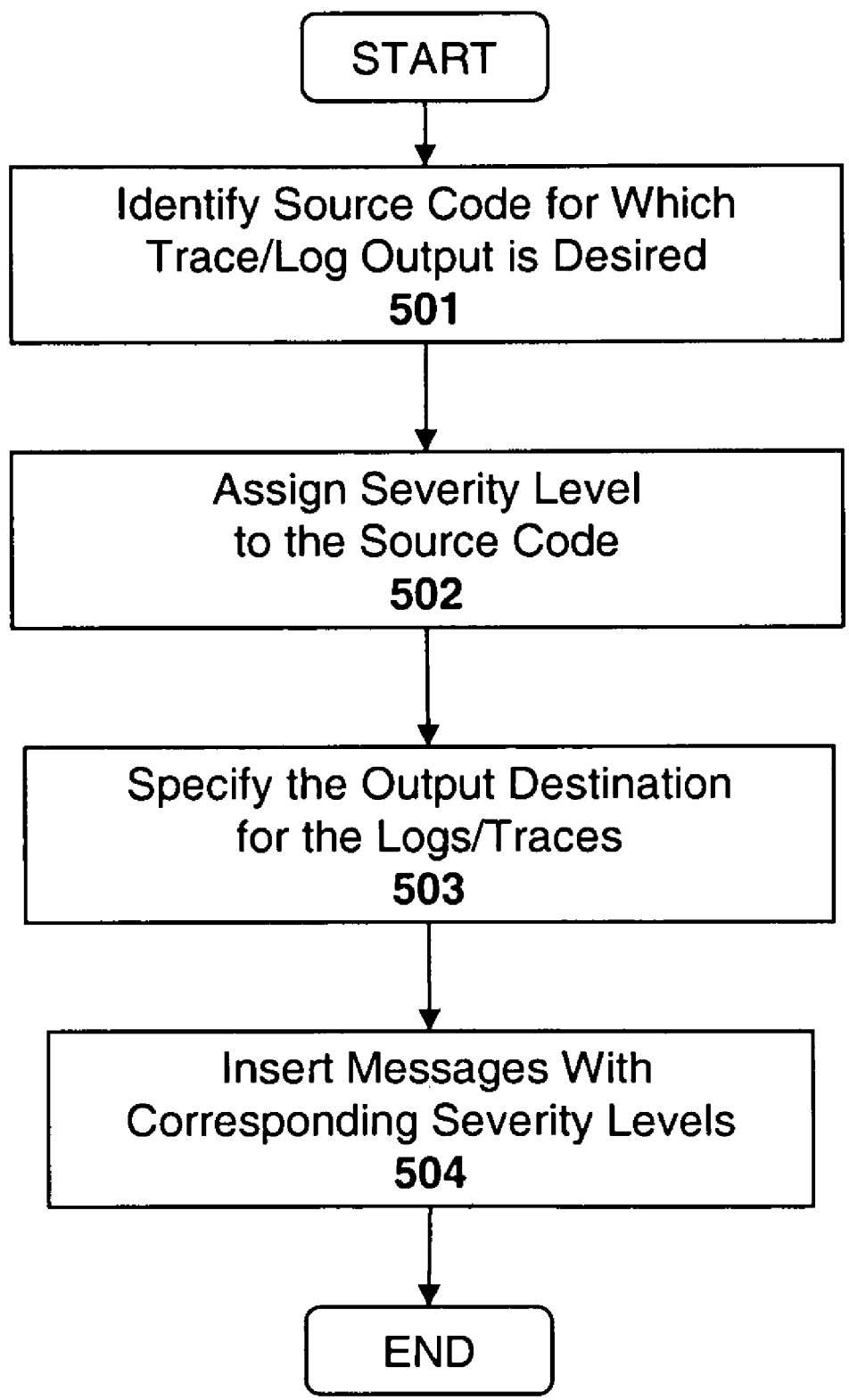
FIG. 5 illustrates a method for configuring logging and tracing according to one embodiment of the invention.

For the purpose of illustration, one particular tracing/logging example will now be described with respect to the method outlined in FIG. 5. The example describes how tracing/logging may be enabled and configured within the architecture illustrated in FIGS. 2-4. Briefly, the method is comprised of: identifying the source code area for which trace/log output is desired (501); assigning severity levels to the source code (502); specifying the output destination for the logs/traces (503); and inserting messages with corresponding severity levels (504).

The following sample code will be used for the example:

```
package com.sap.fooPackage;
import com.sap.tc.logging.*;
    public class Node {
        private static final Location loc =
        Location.getLocation("com.sap.fooPackage.Node");
        public void announce(Object o) {
            String method = "announce(java.lang.Object)";
            loc.entering(method);
            try{
                // do something...
                loc.debugT(method, "Connecting to ...");
            }
            catch (Exception e) {
                loc.fatalT(method,
                    "Error processing object {0}",
                    new Object[ ] {o});
            }
            loc.exiting( );
        }
    }
```

Method elements 502 and 503 are not shown at this point, but assuming the severity level is set to be Severity.ALL (accept all severity levels and output everything) and output has been formatted using a human-readable formatter (e.g., and sent to a console) the output may look like the following:

May 3, 2001 6:54:18 PM
com.sap.fooPackage.Node.announce [main] Path: Entering method
May 3, 2001 6:54:18 PM
com.sap.fooPackage.Node.announce [main] Debug: Connecting to . . . .
May 3, 2001 6:54:18 PM
com.sap.fooPackage.Node.announce [main] Path: Exiting method The following four sections will further explain each step illustrated in FIG. 5.

Identifying the Source Code Area (501)

As described above, the tracing subclass and the logging subclass are subclasses of the controller class. The tracing subclass is sometimes referred to below as the "Location" subclass and the logging subclass is sometimes referred to below as the "Category" subclass. Recall that Location is the source area that generates trace messages. Typically, it corresponds to the source code structure, and can be attached to the level of component, package, class or method. Category is the source area that generates log messages, corresponding to a distinguished problem area, such as networking, system and database.

Although the naming of a Location and Category may be quite flexible, as a general rule, a valid hierarchical naming convention may be useful. A common naming practice for Location is to use the full path of Java package name (See, e.g., FIGS. 3-4).

For the purpose of this example, the following static methods are provided for each class for easy access to a Location or Category:

Location.getLocation(<name of the Location>);

Category.getCategory(<name of the Category>);

Alternatively, instead of passing the name manually, for Location the class instance may be passed (java.lang.Object) or the class itself (java.lang.Class). In either case, the Location object is by default referring to the class level, while using the string argument (java.lang.String) provides flexibility in the definition (e.g., to also include the method name to explicitly control logging over methods individually).

Once identified, the source is ready to be configured to generate messages. In one embodiment, It is recommended that initially, the handle may be configured to be static to improve efficiency:

static final Location loc=Location.getLocation (this.getClass( ))

Assign Severity to Source (502)

Recall that the severity levels employed in one embodiment of the invention are set forth in FIGS. 6*a-b*. Thus, the following predetermined constants may be used: Severity.DEBUG, Severity.PATH, Severity.INFO, Severity.WARNING, Severity.ERROR, Severity.FATAL Severity.MAX, Severity.ALL and Severity.NONE.

The severity may be assigned to the specified source using the following method: loc.setEffectiveSeverity(Severity.INFO);. Using this configuration, any messages with severity lower than INFO will be discarded. Others will be directed to the destination. The concepts associated with hierarchical severity were described above with respect to FIG. 4. Because of the hierarchical naming features of location or category, significant amount of time may be saved by assigning severity levels to the parent of a plurality of children. The children will then automatically inherit the assigned severity as well.

static final Location loc=

Location.getLocation(com.sap.fooPackage);

loc.setEffectiveSeverity(Severity.INFO);

In one embodiment, by default, the source object (assuming the ascendant has not been assigned a severity level yet) is assigned Severity.NONE. As such, a developer may freely enable the output methods in the source code, but the actual logging is not activated until it is explicitly "switched on" when ready.

Specify Output Destination (503)

An output destination such as a log/trace file, a console, an output stream, etc, is assigned to each Location sub-controller or Category sub-controller. This can be accomplished via a method such as the following:

loc.addLog(<log 1>);

There may be instances in which it is desirable to assign multiple output destinations to a single sub-controller. In such a case, a message generated from the sub-controller will be sent to all assigned output destinations simultaneously (e.g., to both a console and a file). This may be accomplished using the following:

loc.addLog(new ConsoleLog( );
loc.addLog(new FileLog("C:\\temp\\testOutput.log");

In one embodiment, as a default configuration, console output destinations 221 are assigned human-readable formatters 231 and file output destinations 220 are assigned list formatters 230. Of course, the default configurations are not required. For example, to switch to an XML Formatter for a file output, the following exemplary method may be called:

loc.addLog(new FileLog("C:\temp\testOutput.log", new XMLFormatter( );

or, alternatively, with an existing file log:

<filelog>.setFormatter(new XMLFormatter( );

Enable Output Messages (504)

After the source is defined, the severity levels are assigned and the destination is properly specified, output statements may be inserted in appropriate places in the program code. For the sake of explanation, the output methods may be logically categorized into three groups. (1) typical message output with severity; (2) output denoting the flow of a program; and (3) master gate.

(1) Typical Message Output With Severity: The following table illustrates the format for a typical output message with severity, where the designated severity level is masked with "xxxx." The "T" designates a typical message output.

| Location | Category |
| --- | --- |
| xxxxT(String message) | xxxxT(Location loc, String message) |
| xxxxT(String subloc, String message) | xxxxT(Location loc, String subloc, String message) |
| xxxxT(String message, Object[] args) | xxxxT(Location loc, String message, Object[] args) |
| xxxxT(String subloc, String message, Object[] args) | xxxxT(Location loc, String subloc, String message, Object[] args) |

A pattern exists in method overloading which evolves around the core argument: message. The addition of subloc, args offers the flexibility for developers to log messages using the level of detail that they need. Understanding these arguments helps when selecting the heavily overloaded methods.

loc:

One difference in the API between Location and Category is an additional loc argument in Category output methods. As described above, log messages are typically written with respect to a source code area. This proves to be very helpful for logging analysis. By specifying the loc argument, a programmer may indicate that the message should be written as a trace message associated with the loc object. By properly configuring loc, logging can be just performed once and piped for both message types (i.e., logs & traces) simultaneously. This technique works for Location as well, and the API is available to specify the category argument. These techniques are explained in more detail below (section entitled "Relationship Between location and Category).

subloc:

The subloc argument is treated as the method name of the source class that the message is generated from. This is optional, but with this argument included in the trace/log, the picture when doing analysis will be much clearer, for example, because different arguments can be specified for overloaded methods).

message:

The actual message to be output is placed in argument message. A designation should be selected that meaningfully describes the situation/problem.

args:

Array of additional arguments that are informative, e.g. dynamic information to be included in the message. In one embodiment, this is achieved by using java.text.MessageFormat API to resolve arguments.

Referring again to the code example set forth above, the following is an example working from the object Location:

```
package com.sap.fooPackage;
import com.sap.tc.logging.*;
public class Node {
    private static final Location loc =
Location.getLocation("com.sap.fooPackage.Node");
    public void announce(Object o) {
        String method = "announce(java.lang.object)";
        try {
            // do something...eg. connecting to DB, perform
certain actions
            loc.debugT(method, "Connecting to ....");
            //minor error in writing something
            loc.warningT(method,
                    "Problems in row {0} to {1}",
                    new Object[ ] {row1, rowN});
            //finish successfully
            loc.infoT(method, "DB action done
successfully");
        }
        catch (Exception e) {
        }
    } // method announce
} // class Node
```

Potential output is as follows, assuming the human-readable formatter is used (e.g., to display on a console):

May 3, 2001 6:54:18 PM
com.sap.fooPackage.Node.announce [main] Debug: Connecting to . . . .
May 3, 2001 6:54:18 PM
com.sap.fooPackage.Node.announce [main] Warning: Problems in row 15 to 18
May 3, 2001 6:54:18 PM
com.sap.fooPackage.Node.announce [main] Info: DB action done successfully The following is another example, working from the object Category:

```
package com.sap.fooPackage;
import com.sap.tc.logging.*;
public class Node {
    private static final Location loc =
Location.getLocation("com.sap.fooPackage.Node");
    private static final Category cat =
Category.getCategory("/System/Database");
    public void store( ) {
        try {
```

-continued

```
        // Write object data to database ...
    }
    catch (FailedRegistrationException e) {
        cat.errorT(loc,
                "store( )",
                "Error storing node {0} in database.",
                new Object[ ] {this});
    }
    } // method store
} // class Node
```

Note that the output will be identical to the previous example, assuming the default setting is used (using a human-readable formatter).

(2) Output Denoting the Flow of a Program: This feature is typically only used for Location sub-controllers. Tracing the flow of a program is comprised of several components: (a) Entering, (b) Exiting, (c) Throwing, and (d) Assertion.

Entering: Outputs a default message (e.g., "Entering Method" with Path severity) indicating that it is entering a source block:

| Method | Description |
| --- | --- |
| Entering( ) | Entering a source block in general |
| Entering(String subloc) | Specify the method name in subloc |
| Entering(Object[] args) | A general source block with arguments: "Entering method with <args>" |
| Entering(String subloc, Object[] args) | Same as above but with specific method name |

(b) Exiting: Output a default message (e.g., "Exiting Method" with Path severity) indicating that it is leaving a source block:

| Method | Description |
| --- | --- |
| Exiting( ) | Exiting a source block in general. As long as the methodname (subloc) is specified in 'entering', it is not necessary to provide subloc as argument here anymore. See the result of the following sample code. |
| Exiting(String subloc) //DEPRECATED | Specify the method name in subloc |
| Exiting(Object res) | A general source block with result: "Exiting method with <res>" |
| Exiting(String subloc, Object res) | Same as above but with specific method name |

To reiterate, refer to the sample code with method announce(Object o):

```
public void announce(Object o) {
    String method="announce(java.lang.Object)";
    loc.entering(method);
    try {
    }
    catch (Exception e) {
    }
    loc.exiting( );
}
```

Potential output, assuming the simplest case with ConsoleLog and default TraceFormatter:
May 3, 2001 6:54:18 PM
   com.sap.fooPackage.Node.announce [main] Path: Entering method
May 3, 2001 6:54:18 PM
   com.sap.fooPackage.Node.announce [main] Path: Exiting method (c) Throwing: Warning message ("Throwing . . . "), indicating that the source block is about to throw an exception:

| Method | Description |
| --- | --- |
| throwing(Throwable exc) | About to throw the exception exc |
| Throwing(String subloc, Throwable exc) | Same as above but with specific method name |

(d) Assertion: used to test a condition and output an error message, normally with the assertion included (e.g., "Assertion failed: <assertion test>") when the evaluation is false:

| Method | Description |
| --- | --- |
| Assertion(Boolean assertion, String desc) | Evaluate the assertion, if false, print desc with the default message: "Assertion failed: <desc>" where <desc> is the assertion test itself, e.g. 5 > 3 |
| Assertion(String subloc, Boolean assertion, String desc) | Same as above but with specific method name |

To reiterate, refer to the sample code with method announce(Object o):

```
public void announce(Object o) {
    String method="announce(java.lang.Object)";
    loc.assertion(method, 5<3, "Stupid comparison");
    try {
    }
    catch (Exception e) {
        loc.throwing(method, e);
    }
}
```

The following is the potential output, again assuming a human-readable log formatter:
May 3, 2001 6:54:18 PM
   com.sap.fooPackage.Node.announce [main] Error: Assertion failed: Stupid comparison
May 3, 2001 6:54:18 PM
   com.sap.fooPackage.Node.announce [main] Warning: Throwing java.io.FileNotFoundException:
   C:\Not Exist\zzzzz.log (The system cannot find the path specified)

(3) Master Gate:

In one embodiment, all of the other output methods (with severity) are ultimately routed through a method, referred to herein as LogT, to actually perform any logging/tracing.

Location: These are similar to the first type of method, xxxxxT( ) but only with an additional severity argument at the beginning:
   logT(int severity, String message)
   logT(int severity, String subloc, String message)
   logT(int severity, String message, Object[ ] args)
   logT(int severity, String subloc, String message, Object[ ] args)

Category: (Similar Scenario to Location):
logT(int severity, Location loc, String message)
logT(int severity, Location loc, String subloc, String message)
logT(int severity, Location loc, String message, Object[ ] args)
logT(int severity, Location loc, String subloc, String message,
Object[ ] args)

Grouping Related Log/Trace Messages

Often, it is useful to put several related messages together into one context. A typical example would be all trace messages stemming from one method call. In case of a database log, another example would be the messages representing the different database operations together forming one logical transaction. A formatter or log viewer can utilize this context information to visualize relations using, for example, indentation or tree controls. Groups are one mechanism to express such context information.

In one embodiment, a group is established via a call to openGroup. This call is based on the same conditions as output calls, that is, the group is opened depending on a severity and optional categories. After generating output the group is ended via a call to closeGroup. Note that there should be a balancing call of closeGroup for any call of openGroup. Even if an openGroup call did not open the group, closeGroup is matched with the call to openGroup. In case of success, in between the two calls, all output calls are assigned to the group. Messages may even be generated with the same condition as the group via the groupT and group output calls. These calls are also used to emit the opening and closing messages of a group, which are the first such messages emitted after the openGroup and closeGroup calls, respectively.

In the above method, for example, the following piece of code could be written. The message right after the openGroup call is the opening message of the group, the message after closeGroup its closing message. Note that the groupT calls do not need a severity, a location or a method name, as these are fetched from the active group.

```
cat.openGroup(Severity.INFO,
        loc,
        method);
cat.groupT("Start storing tree with root {0}.",
        new Object[ ] {this});
...
cat.groupT("Storing subnode {0}.",
        new Object[ ] {node});
...
cat.closeGroup( );
cat.groupT("Finished storing tree.");
```

Establishing Relationships Between Category & Location

It is a common practice to look at log messages and trace messages together when performing a diagnosis. A correlation between a problematic logical area and the source code location that generates the problem is highly desirable. For example, if an error occurs when closing the database, the actual location of the source code (from which class, which method, with what argument(s)) is reported as well.

An embodiment of the invention simplifies the generation of both log and trace messages in parallel, with the use of category and location. This will be illustrated with the following example. For simplicity, the example only shows the attachment of a location to a category (as used herein, a location associated with the category is referred to as a "relative" of the category). However, the same general principles apply to the attachment of a category to a location.

More than one category may be associated with a location at each logging. However, in one embodiment, only one location is assigned for one category. Refer to the output method APIs of each class:

```
Package com.sap.fooPackage;
import com.sap.tc.logging.*;
public class Node {
    private static final Location loc =
Location.getLocation("com.sap.fooPackage.Node");
    private static final Category objMgmt =
Category.getCategory("/Objects/Management");
    public void announce(Object o) {
        final String method =
"announce(java.lang.Object)";
        loc.entering(method, new Object[ ] {o});
        try {
            // Register object ...
        }
        catch (RegistrationException e) {
            objMgmt.errorT(loc,
                method,
                "Error registering object {0}.",
                new Object[ ] {o});
        }
        loc.exiting( );
    } // method announce
} // class Node
```

In order to output all the trace and log messages highlighted in the example above, the following severity setting may be employed:

loc.setEffectiveSeverity(Severity.PATH);
objMgmt.setEffectiveSeverity(Severity.ERROR);
conLog=new ConsoleLog( )
loc.addLog(conLog);
objMgmt.addLog(conLog);

With respect to the output line from the category 'objMgmt', it will output two messages simultaneously: one log message and one trace message. They will have the same message id for cross-referencing each other. This greatly simplifies the analysis.

If the location has stricter severity setting (e.g. default Severity.NONE) all trace output may be suppressed, including the one from the category. In other words, that output line will NOT produce two messages simultaneously, but only the log message.

More advanced configuration may be employed regarding the correlated category and location source objects. For example, consider Category "/Objects/Management" where the only focus may be some extreme situations, that is, messages with severity FATAL. Several source code locations ('com.sapmarkets.xxx.a', 'com.sapmarkets.xxx.b', . . . ) can result in a fatal condition in this logical area, and for certain reasons, one of them may be of particular interest (e.g. 'com.sapmarkets.xxx.a'). As such, it would beneficial to have the ability to generate additional output messages, including all with severity INFO or above, related with this location only, while maintaining FATAL for the rest.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above are implemented within a Java programming environment, various alternate environments may be employed while still complying with the underlying principles of the invention.

Accordingly, the scope and spirit of the invention should be judged in terms of the claims which follow.

What is claimed is:

1. A method, comprising:
   instantiating a first child controller from a first parent controller, said first child controller having a first threshold severity level, said first child controller to write a first received log or trace message into a first respective log or trace file if said first received log or trace message has a severity level above said first threshold severity level, said first child controller having a first minimum severity level setting and a first maximum severity level setting, said first child controller adopting a first inherited severity level from said first parent controller as said first threshold severity level because said first inherited severity level resides between said first minimum and first maximum severity level settings; and,
   instantiating a second child controller from a second parent controller, said second child controller having a second threshold severity level, said second child controller to write a second received log or trace message into a second respective log or trace file if said second received log or trace message has a severity level above said second threshold severity level, said second child controller having a second minimum severity level setting and a second maximum severity level setting, said second child controller not adopting a second inherited severity level from said second parent controller as said second threshold severity level and instead:
      adopting said second minimum severity level setting as said second threshold severity level because said second inherited severity level resides below said second minimum severity level setting; or,
      adopting said second maximum severity level setting as said second threshold severity level because said second inherited severity level resides above said second maximum severity level setting.

2. The method of claim 1 wherein one of the following is true:
   a) said first and second child controllers are log controllers, said first and second received messages are log messages and said first and second respective files are log files;
   b) said first and second child controllers are trace controllers, said first and second received messages are trace messages and said first and second respective files are trace files;
   c) said first child controller is a log controller, said first received message is a log message and said first respective file is a log file, said second child controller is a trace controller, said second received message is a trace message and said second respective file is a trace file.

3. The method of claim 2 wherein c) above is true and said method further comprises:
   informing said first (log) controller that said first (log) controller is to write messages into both said first respective log file and said second respective trace file such that said second (trace) controller is no longer utilized.

4. The method of claim 1 wherein said first inherited severity level is selected for the first parent controller from a plurality of available severity levels that at least include:
   a) a first severity level that indicates the existence of an anomaly that an application can recover from, said application also able to perform a desired task notwithstanding the anomaly;
   b) a second severity level that indicates the existence of an error that an application can recover from, said application also being unable to perform a desired task because of the error;
said selecting of said first inherited severity level including selecting one of a), b) above for said first parent controller.

5. The method of claim 4 wherein the available security levels further include:
   a third severity level whose corresponding messages contain information for debugging;
   a fourth severity level that permits its corresponding messages to contain path information for looping and branching;
   a fifth severity level whose messages are an echo of what has been performed.

6. The method of claim 5 wherein the first and second severity levels are higher severity than the third, fourth and fifth severity levels.

7. An article of manufacture comprising program code stored on a computer readable non-transitory medium, said program code to be read from said computer readable non-transitory medium and processed by one or more processors to perform a method, comprising:
   instantiating a first child controller from a first parent controller, said first child controller having a first threshold severity level, said first child controller designed to write a first received log or trace message into a first respective log or trace file if said first received log or trace message has a severity level above said first threshold severity level, said first child controller having a first minimum severity level setting and a first maximum severity level setting, said first child controller adopting a first inherited severity level from said first parent controller as said first threshold severity level because said first inherited severity level resides between said first minimum and first maximum severity level settings; and,
   instantiating a second child controller from a second parent controller, said second child controller having a second threshold severity level, said second child controller designed to write a second received log or trace message into a second respective log or trace file if said second received log or trace message has a severity level above said second threshold severity level, said second child controller having a second minimum severity level setting and a second maximum severity level setting, said second child controller not adopting a second inherited severity level from said second parent controller as said second threshold severity level and instead:
  adopting said second minimum severity level setting as said second threshold severity level because said second inherited severity level resides below said second minimum severity level setting; or,
  adopting said second maximum severity level setting as said second threshold severity level because said second inherited severity level resides above said second maximum severity level setting.

8. The article of manufacture of claim 7 wherein one of the following is true:
  a) said first and second child controllers are log controllers, said first and second received messages are log messages and said first and second respective files are log files;
  b) said first and second child controllers are trace controllers, said first and second received messages are trace messages and said first and second respective files are trace files;
  c) said first child controller is a log controller, said first received message is a log message and said first respective file is a log file, said second child controller is a trace controller, said second received message is a trace message and said second respective file is a trace file.

9. The article of manufacture of claim 8 wherein c) above is true and said method further comprises:
  informing said first (log) controller that said first (log) controller is to write messages into both said first respective log file and said second respective trace file such that said second (trace) controller is no longer utilized.

10. The article of manufacture of claim 7 wherein said first inherited severity level is selected for the first parent controller from a plurality of available severity levels that at least include:
  a) a first severity level that indicates the existence of an anomaly that an application can recover from, said application also able to perform a desired task notwithstanding the anomaly;
  b) a second severity level that indicates the existence of an error that an application can recover from, said application also being unable to perform a desired task because of the error;
said selecting of said first inherited severity level including selecting one of a), b) above for said first parent controller.

11. The article of manufacture of claim 10 wherein the available security levels further include:
  a third severity level whose corresponding messages contain information for debugging;
  a fourth severity level that permits its corresponding messages to contain path information for looping and branching;
  a fifth severity level whose messages are an echo of what has been performed.

12. The article of manufacture of claim 11 wherein the first and second severity levels are higher severity than the third, fourth and fifth severity levels.

13. A computer comprising program code stored in memory of said computer system, said memory coupled to one or more processors of said computing system, said program code to be read from said memory and processed by said one or more processors to perform a method, comprising:
  instantiating a first child controller from a first parent controller, said first child controller having a first threshold severity level, said first child controller designed to write a first received log or trace message into a first respective log or trace file if said first received log or trace message has a severity level above said first threshold severity level, said first child controller having a first minimum severity level setting and a first maximum severity level setting, said first child controller adopting a first inherited severity level from said first parent controller as said first threshold severity level because said first inherited severity level resides between said first minimum and first maximum severity level settings; and,
  instantiating a second child controller from a second parent controller, said second child controller having a second threshold severity level, said second child controller designed to write a second received log or trace message into a second respective log or trace file if said second received log or trace message has a severity level above said second threshold severity level, said second child controller having a second minimum severity level setting and a second maximum severity level setting, said second child controller not adopting a second inherited severity level from said second parent controller as said second threshold severity level and instead:
    adopting said second minimum severity level setting as said second threshold severity level because said second inherited severity level resides below said second minimum severity level setting; or,
    adopting said second maximum severity level setting as said second threshold severity level because said second inherited severity level resides above said second maximum severity level setting.

14. The computer of claim 13 wherein one of the following is true:
  a) said first and second child controllers are log controllers, said first and second received messages are log messages and said first and second respective files are log files;
  b) said first and second child controllers are trace controllers, said first and second received messages are trace messages and said first and second respective files are trace files;
  c) said first child controller is a log controller, said first received message is a log message and said first respective file is a log file, said second child controller is a trace controller, said second received message is a trace message and said second respective file is a trace file.

15. The computer of claim 14 wherein c) above is true and said method further comprises:
  informing said first (log) controller that said first (log) controller is to write messages into both said first respective log file and said second respective trace file such that said second (trace) controller is no longer utilized.

16. The computer of claim 13 wherein said first inherited severity level is selected for the first parent controller from a plurality of available severity levels that at least include:
  a) a first severity level that indicates the existence of an anomaly that an application can recover from, said application also able to perform a desired task notwithstanding the anomaly;
  b) a second severity level that indicates the existence of an error that an application can recover from, said application also being unable to perform a desired task because of the error;
said selecting of said first inherited severity level including selecting one of a), b) above for said first parent controller.

17. The computer of claim 16 wherein the available security levels further include:
  a third severity level whose corresponding messages contain information for debugging;

a fourth severity level that permits its corresponding messages to contain path information for looping and branching;

a fifth severity level whose messages are an echo of what has been performed.

18. The computer of claim 17 wherein the first and second severity levels are higher severity than the third, fourth and fifth severity levels.

* * * * *